United States Patent [19]
Fanto-Kuertoes et al.

[11] 3,860,370
[45] Jan. 14, 1975

[54] APPARATUS FOR THE MANUFACTURE OF FIBERS

[75] Inventors: Peter Robert Fanto-Kuertoes; Ralf Stellan Marek, both of Frolunda, Sweden

[73] Assignee: Continentale Linoleum Union Betriebs AG, Zurich, Switzerland

[22] Filed: June 15, 1973

[21] Appl. No.: 370,236

[30] Foreign Application Priority Data
June 15, 1972 Sweden.......................... 007984/72

[52] U.S. Cl.................... 425/72, 264/164, 425/289, 425/455
[51] Int. Cl............................................. D01d 5/12
[58] Field of Search............... 425/66, 335, 437, 72; 264/164; 65/6; 156/181

[56] References Cited
UNITED STATES PATENTS

| | | |
|---|---|---|
| 1,270,096 | 6/1918 | Baker................................. 425/335 |
| 2,522,526 | 9/1950 | Manning......................... 156/181 X |
| 2,687,363 | 8/1954 | Manning.............................. 65/6 X |
| 3,738,884 | 6/1973 | Soehngen........................ 264/164 X |

Primary Examiner—Robert D. Baldwin
Attorney, Agent, or Firm—Werner W. Kleeman

[57] ABSTRACT

An apparatus for the manufacture of fibres formed by stretching apart and cooling a thermoplastic material heated to at least its melting temperature, said apparatus comprising webs running over supports and forming between them a gap into which the heated thermoplastic material is fed and the width of which increases from the feeding end of the gap in the direction of movement of the thermoplastic material, the width at the feeding end of the gap being defined by means of a pair of supports which are adjustable in relation to each other, wherein the gap increase being defined by means of at least one pair of means which are adjustable as to their distance relative each other and which are provided with at least partly perforated support surfaces for the webs running across them.

7 Claims, 3 Drawing Figures

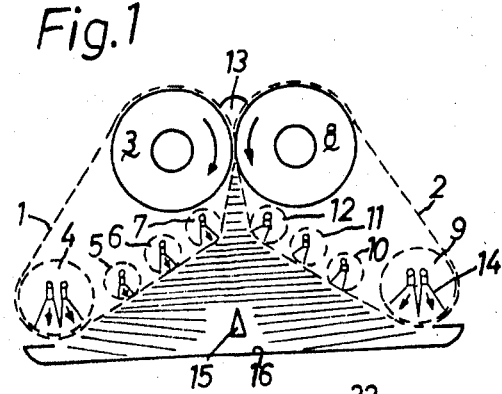
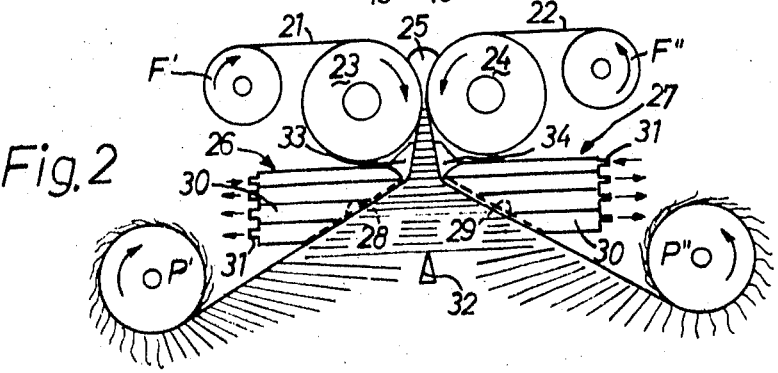
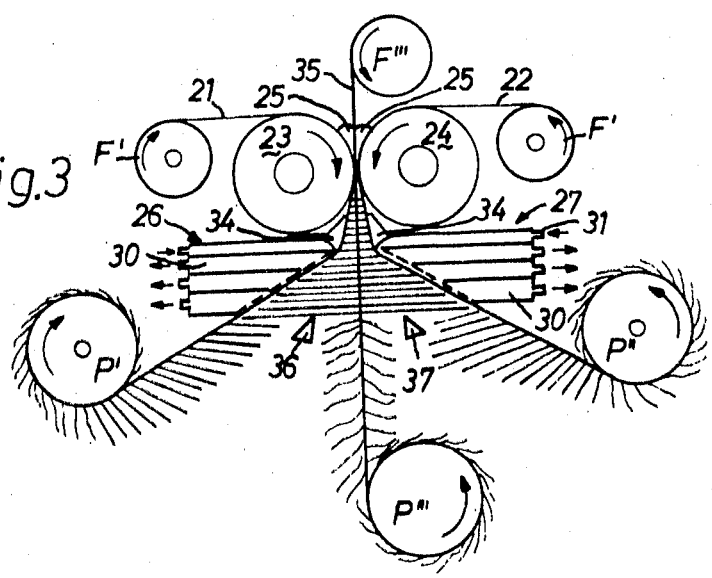

– 3,860,370 –

APPARATUS FOR THE MANUFACTURE OF FIBERS

BACKGROUND OF THE INVENTION

This invention relates to an apparatus for the manufacture of fibres, which are obtained by stretching apart and cooling a thermoplastic material which has been heated at least to its melting point. Such an apparatus has means for the feeding and stretching apart of a layer of the thermoplastic material and means for heating and cooling said material layer. More particularly, such an apparatus comprises belts running over supports, said belts forming between them a gap in which the heated thermoplastic material is introduced. The width of this gap increases in the direction of movement from the feeding point, being determined at the end by a pair of supports, which are adjustable in relation to each other.

In a proposed known apparatus of this kind, the belts are endless and comprise two carriers having a non-adhesive surface layer, e.g., comprising silicon compounds or "Teflon." The supports for the belts comprise two pairs of rollers. One of these pairs of rollers forms the gap in the shape of a nip between the bands, the latter comprising, e.g., "Teflon" coated glass fabric. When travelling downstream the gap, the thermoplastic material, which has been brought to its melt temperature during the passage through the nip between the first pair of rolls, is pulled apart in the widening gap between the two belts, thus being transformed into fibres. At the downstream end of the gap a gaseous medium is fed under pressure into the gap, thereby cooling the newly formed fibres of thermoplastic material and stabilizing the fibre structure. The desired fibre length is achieved by adjustment of the distance between the second pairs of rollers as this distance determines the angle, at which the belts separate. If the production of a pile or fell rather than staple fibres is envisaged, a web is allowed to follow closely one of the two endless belts, in which case named web is covered with fibres, thus forming the backing of the produced pile or fell.

A differently constructed apparatus for the manufacture of fibres, piles as well as fells has also been proposed. In this apparatus the means for, on one hand, feeding and tearing up the thermoplastic material layer and, on the other hand, for heating of the same are combined. They comprise a driven roller, which can be heated, and a driven web, which is brought into contact with the roller, feeding the thermoplastic material into the nip between itself and the roll at the point of first contact between these machine elements and splitting it up to form fibres, where the roller and the web are separating from each other, at which point a means for cooling is arranged.

Manufacture of fibres by means of the apparatus described in the afore-said has, however, shown a number of essential shortcomings. At both ends of each fibre during its formation there is a residue of thermoplastic material, which is not used to the best advantage to obtain the desired fibre length and thickness and fibre adhesion to the surface of the belt or the web. Also, the strength of the fibres is rather poor and, finally, if the web is rather thin in order to form a highly flexible part of a fibre fell or a pile, it is difficult to obtain sufficiently well defined and uniform tensile forces in each fibre during their stretching between the belt and the web or between the roller surface and the web, respectively.

SUMMARY OF THE INVENTION

It is the object of the invention to eliminate these shortcomings and to provide an apparatus of the kind mentioned in the introductory part, said apparatus also resulting in a more efficient manufacture of fibres and piles of fells. This object is fully achieved mainly thereby, that an apparatus according to the invention closely controls the increase of the gap width by at least one pair of means, which are adjustable with respect to their mutual distance and which are provided with at least partly perforated contact surface for the webs running across them.

Due to the particular shape of the contact surfaces of the means controlling the gap increase, it is possible during fibre manufacture and by relatively simple means to obtain good control of the temperature and of the stretching condition in the fibres themselves as well as with respect to the residues of thermoplastic material being found at both ends of each fibre in contact with the webs of carriers. In a preferred embodiment of the invention, this is obtained by an apparatus comprising means for blowing as well as for exhausting a gaseous medium regulating the gap increase. Depending on the desired closeness of control, either one of these two types of means for causing a flow of gas through the perforated surfaces may be omitted. However, in order to obtain the widest possible range to control temperature and stretching conditions during the deformation of the thermoplastic material into fibres, both types of gas feeding means should be present on the apparatus at the same time and they should be arranged under the perforated contact surfaces in optional order. Also, the apparatus should preferably comprise means for heating and/or cooling the gaseous medium.

The means defining the increase of the gap width and having at least partly perforated support surfaces for the webs or the carriers may have various shapes. If an apparatus according to the invention is mainly intended for the manufacture of so called staple fibres, the web may in a way which is previously known to the art, comprise endless belts. They may be made of a net, a perforated foil or the like of a material releasing on sufficient cooling the thermoplastic material, which has been torn into fibres. The means defining the increase of the gap width preferably comprises at least one pair of hollow rollers or drums, housing in their interiors the means for exhausting and/or blasting the gaseous medium, these means being arranged optionally along the circumference of the roll or drum.

If, however, a fibre fell or a pile is to be produced by means of an apparatus according to the invention, the webs should be made from a material suitable to form a permanent carrier of the fibres formed from the thermoplastic material. This implies gas permeable webs which cannot be endless and, therefore, are unwound from supply rolls or the like. Thus, an apparatus according to the invention may preferably be provided with means defining the gap width and having at least partly perforated support surfaces for the webs in a shape reminiscent of two hollow collector shoes, housing in their interiors the means for exhausting and/or blowing the gaseous medium arranged optionally along the insides of the contact surfaces along the direction of movement of the webs.

To obtain exceptionally good adhesion between the thermoplastic layer and the web or belt during fibre formation, an apparatus according to the invention may comprise also means for cooling at least a part of the surfaces of the means defining the gap width, supporting the running webs or belts.

BRIEF SUMMARY OF THE DRAWINGS

The invention will now be explained with reference to two embodiments shown diagrammatically in the accompanying drawings.

FIG. 1 shows a side view of one embodiment of an apparatus according to the invention for the manufacture of staple fibre and provided with means defining the gap width in the shape of rollers or drums, webs in the shape of endless belts running over said rollers or drums.

FIG. 2 shows also a side view of an embodiment intended for the simultaneous manufacture of two fells having fibres on one side, said apparatus being provided with support means defining the gap width, with elements in the shape of collector shoes, the webs running over these elements being parmanently incorporated in the fell as a carrier.

FIG. 3 shows the embodiment according to FIG. 2 but provided with a further web such that three fells, viz. two carrying fibres on one side and one carrying fibre on both sides, may be manufactured simultaneously in the apparatus.

DESCRIPTION OF THE PREFERRED EMBODIMENT

In FIG. 1 reference numerals 1 and 2 denote each a driven endless belt of a metal thread net or a perforated foil or the like of a material, which releases the fibre forming thermoplastic material on sufficient cooling. The two webs 1, 2 run over a number of supports in the shape of pulleys 3–7 and 8–12, respectively, at least one of these pulleys for each web being driven. The two webs 1, 2 form between them a gap. A thermoplastic material 13 is fed into this gap and the width of the gap increases from the feeding nip of the gap in the direction of movement of the thermoplastic material. The width of the feeding nip of the gap is determined by the distance between two of the supports, i.e., the rollers 3 and 8, which are adjustable relatively to each other. These rollers are manufactured preferably from metal and they may either be heated or cooled depending on the temperature of the thermoplastic material fed onto them and the temperature most suitable for fibre formation.

The increase in the width of the gap is defined by four pairs of supports, viz. the pairs comprising the rollers or the drums 7 and 12, 6 and 11, 5 and 10 and 4, 9, respectively. The supports of the rollers or the drums in each one of these pairs are adjustable as to their distance in relation to each other such that the gap width most suitable for each fibre length may be adjusted by means of these rollers. As a consequence thereof, and as the contact surfaces for the webs or endless belts 1 and 2 running over them are at least partly perforated, it is possible to obtain a predetermined stretching and controlled temperature conditions at the deformation of the thermoplastic material 13 into fibres in the gap of increasing width between the webs or the bands 1, 2, The desired temperature conditions may be established through the perforated support surfaces on said rollers or drums simply by placing means for exhausting as well as for blasting a gaseous medium under the surfaces or in the interior of the rollers or of the drums 4–7, 9–12, which are hollow. These means may be shaped in various ways and may, e.g., take the shape of fixed funnels 14 of the kind shown in FIG. 1, where one or several funnels of such a kind are stationarily arranged below the perforated support surfaces of the rotating rollers or drums 4–7, 9–12 for the belts or the webs 1, 2 and having their upper wide ends directed towards the perforated surface of the cooperating roller and having their narrow ends shaped as pipe sockets for being connected to conduits of positive or negative pressure for the gaseous medium, which preferably comprises air. If a roller or a drum 4–7, 9–12 has a large diameter and the webs or the bands 1, 2 run over the same along a large enclosing angle, it is advisable to arrange the funnels 14 such that they may be distributed optionally along the inside of the circumference of the roller or the drum within the sector defined by the enclosing angle of the roller or the drum. This will enhance the range of temperature control at this roller or drum.

The fact that a gaseous medium such as air is blown and/or exhausted through the perforated contact surfaces of the supports - comprising the rollers or the drums 4–7, 9–12, - for the webs or the belts 1, 2, results both in a uniform cooling of the thermoplastic's residuals at the external ends of the fibres in the gap and good attachment of the web or the belts to their support surfaces which gives will defined stretching conditions and renders possible an increase of the stretching forces during the formation of the fibres.

Further increased possibilities of temperature control in the gap or the fibre formation zone are obtained, if the apparatus according to the invention as shown in FIG. 1 is provided with means for heating and/or cooling the gaseous medium. These apparatus may be very simple and comprise, e.g., heat cartridges or cooling batteries arranged in the conduits through which the medium flows to the injection means or the funnels 14.

In the embodiment of the device according to the invention shown in FIG. 1 air injection is provided through the pairs of supports formed by the rollers 7 and 12 as well as 4 and 9 as indicated by means of arrows, while air is exhausted through the support rollers 6 and 11 as well as 5 and 10. This means, that the thermoplastic material 13, which is laminated between the rollers 3 and 8 and then on the downstream side of the nip torn to form fibres bridgeing the gap and adhering with their ends to the webs 1 and 2, respectively, and by the movements of the same increasing their length in accordance with the gradually increasing gap width, may be heated or cooled, as need may be, along the whole fibre length between the rollers 7 and 12, such that the temperature always is kept at a level of technical importance. This, in combination with the air suction applied through the roller pairs 6, 11 and 5, 10, respectively, results in a cooling action on the contact points of the fibres to the webs, as well as the suction will keep the webs to their contact surfaces on the rollers, thereby causing additional fibre stretching. This increases the orientation of the molecules in the fibres, enhancing their mechanical strength.

Having reached the desired length at the end of the gap, the finished fibres meet a hot wire or any other suitable severing means 15, cutting them off, e.g., at their central portion, their ends adhering to the web. They are finally released, e.g., by blowing cool air through the webs at the rollers 4 and 9. The fibres thus freed from the carrier drop then as staple fibres into a collecting container 16, placed below the zone of fibre stretching.

By the substantial elongation of the fibres, obtained through the use of the apparatus according to the invention, the fibres may be cut at their central portion and still retain a commercially and/or technically useful length, which implies not only stronger fibres but also increased productivity.

In the embodiment shown in FIG. 2 of an apparatus according to the invention the two webs 21 and 22 comprise webs, which are unwound from supply rolls F' anf F'', said webs comprising, e.g., a thin nonwoven material which is suitably chosen to be permanently incorporated as carrier of the fibres formed by tearing the thermoplastic material 25 which has been heated at least to its melting temperature.

In the same way as in the embodiment shown in FIG. 1, the two webs form a gap of increasing width for fibre stretching. The webs run from their supply rolls over a pair of driven rollers 23, 24 which are adjustable in relation to each other and which, depending on the temperature of the thermoplastic material fed in between them and the temperature most convenient for fibre formation, are adatped to be heated or cooled.

The increase in the gap width in this case, and contrary to the arrangement at the apparatus according to FIG. 1, is defined by at least one pair of hollow elements 26, 27 in the shape of collector shoes having perforated support surfaces 28, 29 for the webs 21, 22. In the interior of these elements are distribution channels 30, separated from each other and arranged optionally along the inner surfaces of the perforated support surfaces in the direction of movement of the webs and arranged with their open ends for optional suction and/or blast of the gaseous medium, preferably air, through the perforated support surfaces. For connection to lines feeding them with negative or positive air pressure, the distribution channels are provided with connection means, e.g., in the shape of pipe sockets 31. In FIG. 2 arrows indicate the direction of air flow through these pipe sockets 31 in a preferred embodiment of the invention.

The fibre manufacture proper is carried out in this apparatus as in the one shown in FIG. 1, with the exception that the fibres severed by the cutting means 32 in this case follow each their carrier and form a fell coated by fibres on one side, which is wound up on the rolls for finished product P' and P'', respectively.

As obvious from FIG. 2, the elements 26, 27, shaped as collector shoes may also include special means for cooling at least a part of the contact surfaces of the elements or the supports for the running webs, which increase the adhesion of the fibre ends to the webs 21, 22 during the fibre stretching. These cooling means may take the shape of, e.g., channels 34 for a circulating cooling medium and have rather thin walls. The channels 34 are situated at the upstream ends of the elements, having the shape of collector shoes.

The apparatus shown in FIG. 3 according to the invention corresponds completely to the one shown in FIG. 2 and the latter figure differs from the preceding one only thereby, that the apparatus shown therein is fed with a third web 35 from a supply roll F''' through the fibre forming gap, where, during fibre formation, it is cooated with fibres on both sides. After severing the fibres by means of hot wires or other cutting means 36, 37, the finished fibre fell is wound up on a roll P''' and at the same time the two webs 21,22 each provided with fibres on one side only, are wound up on the rolls P' and P''.

The figures of the apparatus are schematical and are intended only to illustrate the idea of the invention, whereas the dimensions of the details and the gap widths used and the indicated fibre lengths are not to be understood as indications of relative size.

While there is shown and described present preferred embodiments of the invention, it is to be distinctly understood that the invention is not limited thereto, but may be otherwise variously embodied and practiced within the scope of the following claims.

What is claimed is:

1. An apparatus for the manufacture of fibres formed by stretching apart and cooling a thermoplastic material heated to at least its melting temperature, said apparatus comprising webs running over supports and forming between them a gap into which the heated thermoplastic material is fed and the width of which increases from the feeding end of the gap in the direction of movement of the thermoplastic material, the width at the feeding end of the gap being defined by means of a pair of supports which are adjustable in relation to each other, the gap increase being defined by means of at least one pair of means which are adjustable as to their distance relative to each other and which are provided with at least partly perforated support surfaces for the webs running across them, means for exhausting a gaseous medium through the perforated support surfaces, means for the blowing of a gaseous medium through the perforated support surfaces, said means for the suction and blowing are arranged under the perforated support surfaces in optional mutual order to obtain defined temperature and stretching conditions at the deformation of the thermoplastic material.

2. The apparatus as claimed in claim 1, wherein said means defining the width increase of the gap and having the partly perforated support surfaces for the webs, comprise at least one pair of hollow rollers or drums, said means for suction and/or blowing of the gaseous medium being arranged in the interior of said rollers or drums optionally distributable along the circumference.

3. The apparatus as claimed in claim 1, wherein said means controlling the width increase of the gap and having at least partly perforated support surfaces for the webs, comprise at least one pair of hollow elements in the shape of collector shoes and housing in their interior the means for suction and/or blowing of gaseous medium, said means being optionally distributable along the inside of the perforated support surfaces in the direction of movement of the webs.

4. The apparatus as claimed in claim 1, further comprising means for heating and/or cooling the gaseous medium to be exhausted.

5. The apparatus as claimed in claim 1, further comprising means for cooling at least a part of the support surfaces of the means defining the gap increase for the webs.

6. The apparatus as claimed in claim 1, wherein the webs comprise a net, a perforated foil or the like of a material releasing the thermoplastic material, stretched apart to form the fibres, on sufficient cooling.

7. The apparatus as claimed in claim 1, wherein the webs are chosen to be incorporated as a carrier for the fibres formed at the stretching apart of the thermoplastic material.

* * * * *